US 9,822,966 B2

(12) United States Patent
Sripada et al.

(10) Patent No.: US 9,822,966 B2
(45) Date of Patent: Nov. 21, 2017

(54) QUENCH SYSTEM, SYSTEM HAVING QUENCH SYSTEM, AND METHOD OF SUPERHEATING STEAM

(71) Applicant: General Electric Company, Schenectady, NY (US)

(72) Inventors: Rajeshwar Sripada, Karnataka (IN); Paromita Bhattacharya, Karnataka (IN); Pallab Karmakar, Karnataka (IN); Atul Kumar Vij, Karnataka (IN)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 14/818,805

(22) Filed: Aug. 5, 2015

(65) Prior Publication Data
US 2017/0038060 A1 Feb. 9, 2017

(51) Int. Cl.
*C10J 3/86* (2006.01)
*F22G 1/14* (2006.01)
*F22B 1/18* (2006.01)
*F22G 1/16* (2006.01)

(52) U.S. Cl.
CPC .................. *F22G 1/14* (2013.01); *C10J 3/86* (2013.01); *F22B 1/1838* (2013.01); *F22G 1/16* (2013.01); *Y02E 20/16* (2013.01); *Y02E 20/18* (2013.01)

(58) Field of Classification Search
CPC ........................... C10J 3/86; F28D 2021/0075
USPC .......................... 60/655, 670, 648; 48/197 R
See application file for complete search history.

(56) References Cited

U.S. PATENT DOCUMENTS

| | | | | |
|---|---|---|---|---|
| 4,359,326 A | * | 11/1982 | Hoffert | B01J 8/0005 110/245 |
| 8,197,564 B2 | * | 6/2012 | Jimenez-Huyke | C01B 3/36 422/207 |
| 8,420,031 B2 | * | 4/2013 | Thacker | C10L 3/08 122/7 R |
| 8,783,036 B2 | * | 7/2014 | Corry | C10J 3/86 48/197 R |
| 2010/0139581 A1 | * | 6/2010 | Ebner | C10J 3/485 122/7 R |
| 2012/0273175 A1 | * | 11/2012 | Blanchard | C10K 1/04 165/157 |
| 2012/0273176 A1 | * | 11/2012 | Blanchard | C10K 1/04 165/157 |
| 2014/0069612 A1 | * | 3/2014 | Chen | C10J 3/86 165/81 |

* cited by examiner

*Primary Examiner* — Gregory A Wilson
(74) *Attorney, Agent, or Firm* — Ernest G. Cusick; Frank A. Landgraff

(57) ABSTRACT

A quench system includes a housing having a longitudinal axis, a gas path for a gas within the housing, a steam input and output, and a dip tube within the housing. The dip tube includes tubing arranged to form a wall. A steam path, separate from the gas path, is disposed within the tubing in a thickness of the wall. The dip tube is configured to allow passage of the gas along the gas path. The steam input is fluidically connected to the steam output by the tubing. The quench system is configured to cool the gas along the gas path and heat steam along the steam path within the tubing of the dip tube.

20 Claims, 10 Drawing Sheets

US 9,822,966 B2

QUENCH SYSTEM, SYSTEM HAVING QUENCH SYSTEM, AND METHOD OF SUPERHEATING STEAM

BACKGROUND OF THE DISCLOSURE

The subject matter disclosed herein relates to a syngas cooler system and a method of superheating steam in a syngas cooler system.

A gasifier converts carbonaceous materials into a mixture of carbon monoxide and hydrogen, referred to as synthesis gas, synthetic gas, or syngas. The syngas may be used for power generation, chemical production, or any other suitable application. Prior to use, the syngas may be cooled in a syngas cooler and treated in a gas treatment system.

An integrated gasification combined cycle ("IGCC") power plant or a chemical application plant includes one or more gasifiers that use a feedstock, such as coal or natural gas, interacting with oxygen and/or steam to produce syngas. Gasification systems may convert the carbonaceous feedstock, or another fuel, into a gaseous mixture of carbon monoxide (CO) and hydrogen ($H_2$), i.e., syngas, by reaction with oxygen and steam in a gasifier. Upon gasification, the resulting syngas may include less desirable components, such as ash. The syngas may be directed through a quench chamber to cool the syngas to a saturation temperature and remove the less desirable components as a slag.

Current radiant syngas coolers ("RSC") are designed to produce saturated high pressure steam. In IGCC applications, the steam from RSC is integrated with heat recovery steam generation ("HRSG") superheater for power production. However, in chemical applications, the steam from RSC may be required to run air separation unit ("ASU") compressors. To use the steam from RSC, it is necessary to superheat the steam. With current RSC, the end user is required to design a superheating section separately in the balance of plant ("BoP").

BRIEF DESCRIPTION OF THE DISCLOSURE

According to one aspect of the disclosure, a quench system includes a housing having a longitudinal axis, a gas path for a gas within the housing, a steam input and output, and a dip tube within the housing. The dip tube includes tubing arranged to form a wall. A steam path, separate from the gas path, is disposed within the tubing in a thickness of the wall. The dip tube is configured to allow passage of the gas along the gas path. The steam input is fluidically connected to the steam output by the tubing. The quench system is configured to cool the gas along the gas path and heat steam along the steam path within the tubing of the dip tube.

According to another aspect of the disclosure, a system includes a gas cooler, which includes a housing having a longitudinal axis, a gas path, and a quench system including a quench pool, a saturated steam input, and a dip tube including tubing arranged to form a wall of the dip tube. A steam path is disposed within the tubing in a thickness of the wall. The wall is configured to pass a gas from an upstream portion to a downstream portion of the dip tube along the gas path. The tubing fluidically connects the saturated steam input to a superheated steam output, and the gas passing along the gas path heats the saturated steam in the tubing.

According to yet another aspect of the disclosure, a method of superheating steam in a syngas cooler includes directing saturated steam to a dip tube of a quench system of the syngas cooler, the dip tube having a wall formed of superheating tubing within a thickness of the wall; passing a syngas along a gas path from an upstream portion to a downstream portion of the dip tube, the gas exiting the dip tube into a quench pool; and, superheating the saturated steam through the tubing of the dip tube from the downstream portion to the upstream portion of the dip tube using heat from the syngas.

These and other advantages and features will become more apparent from the following description taken in conjunction with the drawings.

BRIEF DESCRIPTION OF THE DRAWING

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Reference will now be made in detail to present embodiments of the disclosure, one or more examples of which are illustrated in the accompanying drawings.

Figure 1:
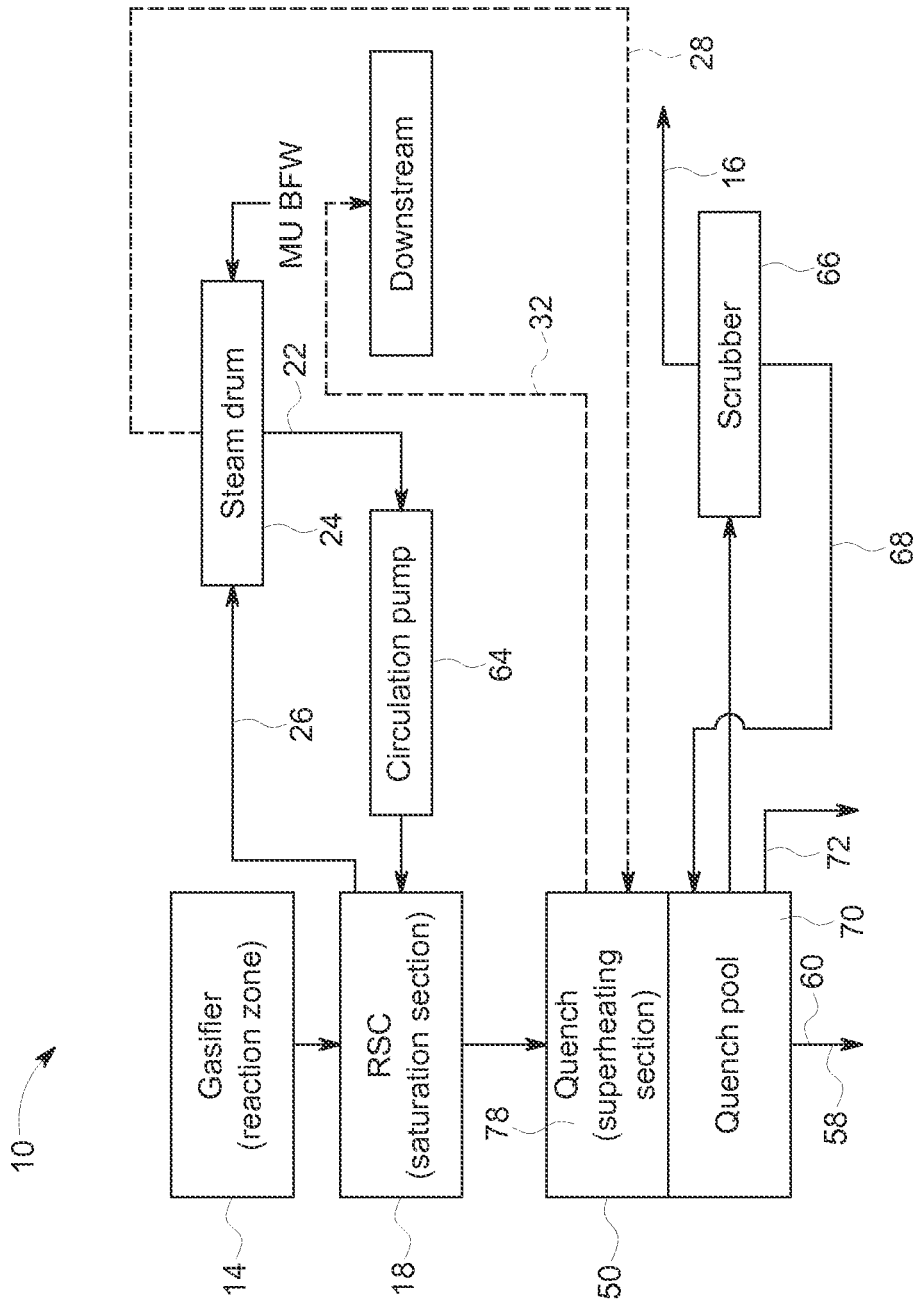
FIG. 1 is a block diagram of a portion of an embodiment of a gasification system incorporating an embodiment of a syngas cooler and quench system.

Referring now to the drawings, wherein identical numerals indicate the same elements, or substantially the same elements, throughout the figures, FIG. 1 shows a diagram of a portion of a gasification system 10 that produces a gas, such as syngas 16, and a superheated steam 32. For example, the gasification system 10 may be part of a chemical production gasification plant or a power plant, such as an integrated gasification combined cycle ("IGCC") power plant. The gasification system 10 may include an embodiment of a gas cooler 18, such as a syngas cooler 18, configured to cool the syngas, and a quench system 50 configured to remove particulates from the syngas 16 and provide further cooling of the syngas 16. As will be further described below, the syngas cooler 18 is further configured to produce a saturated steam, and the quench system 50 is further configured to generate a superheated steam using the saturated steam from the syngas cooler 18. The syngas cooler 18 may be a radiant syngas cooler "RSC" saturation section. In other embodiments, the syngas cooler 18 may be a gas fuel cooler or, more generally, a gas cooler. In addition, in various embodiments, the syngas cooler 18 may include, but is not limited to, a radiant syngas cooler ("RSC"), a convective syngas cooler, a water jacketed gasifier, a convective cooler, a water wall cooler, a fired-tube cooler, a heat exchanging device, and so forth. The gasification system 10 further includes a gasifier 14, which delivers the syngas 16 to the syngas cooler 18. Steam and water mixture 26 from the syngas cooler 18 may be delivered to steam drum 24, which directs circulation water 22 back to the syngas cooler 18 via circulation pump 64, and directs saturated steam 28 to the superheating section in the quench system 50. The superheated steam 32 from the quench system 50 is delivered downstream for use in the plant, while the syngas 16 is sent to a scrubber 66. The scrubber 66 outputs quench water 68 to the quench pool 70 of the quench system 50, as well as the syngas 16 from the scrubber 66. The quench system 50 also outputs slag 58 and water 60 from the quench pool 70 and quench blowdown 72.

Figure 2:
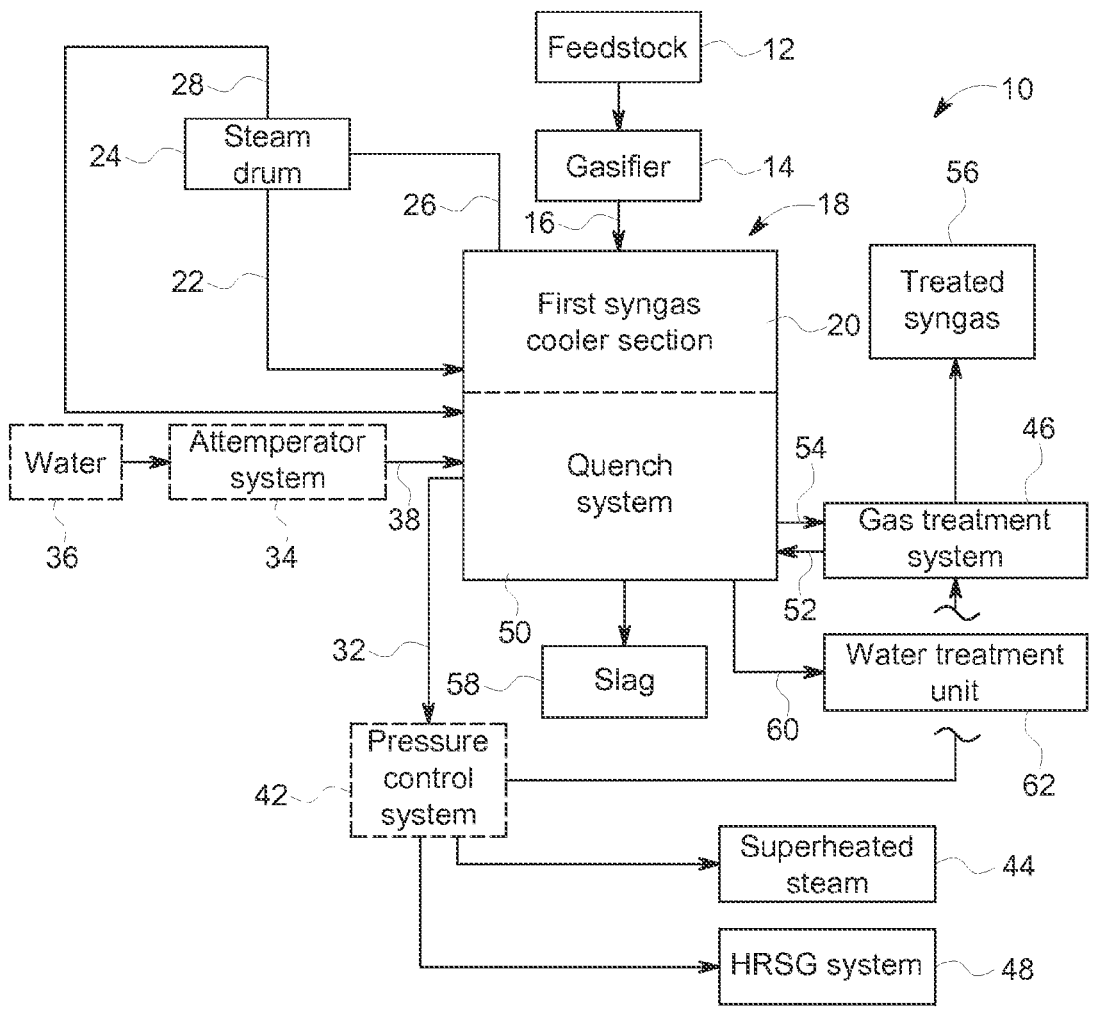
FIG. 2 is a block diagram of a portion of an embodiment of a gasification system incorporating the syngas cooler and quench system of FIG. 1.

Further details and alternative embodiments regarding the overall gasification system 10 will be shown and described with respect to FIG. 2. In the illustrated embodiment, a feedstock 12, which may be a solid or a liquid, is used to feed the gasification system 10. The feedstock 12 may include coal, petroleum coke, oil, biomass, wood-based materials, agricultural wastes, tars, coke oven gas and asphalt, or other carbon containing items. Next, the feedstock 12 is injected into a gasifier 14 (reaction zone), which converts the feedstock 12 into syngas 16 (e.g., a combination of carbon monoxide (CO), carbon dioxide ($CO_2$), and hydrogen). This conversion may be accomplished by subjecting the feedstock 12 to a controlled amount of water and oxygen at elevated pressures. The gasification process may generate a solid (e.g., char) and gases (e.g., CO, $CO_2$, hydrogen, water, and nitrogen). In various embodiments, the gasifier 14 may be an upflow or downflow gasifier 14. In addition, the gasifier 14 may include single or multiple nozzles for the feedstock 12, oxidant (e.g. oxygen), and/or moderator (e.g., steam). In other embodiments, non-gasification processes may be used to produce the syngas 16. For example, a coke oven or other processes may generate the syngas 16.

The output or syngas 16 from the gasifier 14 is sent to the syngas cooler 18, which is configured to cool the syngas 16 in the illustrated embodiment. The syngas cooler 18 may include one or more sections. Each section of the syngas cooler 18 is configured as a heat exchanger, such as a shell-and-tube heat exchanger. For example, the syngas cooler 18 may include a first syngas cooler section 20, which may use water 22 from the steam drum 24 to cool the syngas 16 from the gasifier 14. In certain embodiments, the heat from the syngas 16 passing through a shell may cause the water 22 passing through one or more tubes to boil, thereby producing a saturated steam 28. In other embodiments, the syngas 16 may pass through one or more tubes and the water 22 may pass through a shell. However, any suitable heat exchanger and configuration of flow paths may be used for the first syngas cooler section 20. In certain situations, not all of the water 22 in the first syngas cooler section 20 boils, resulting in a mixture 26 of saturated steam and water, which may be directed from the first syngas cooler section 20 to the steam drum 24. Other embodiments may include more than one steam drum 24. The steam drum 24 may be a pressure vessel used to separate the liquid and gas phases of the mixture 26 of saturated steam and water. Specifically, the water 22 may accumulate near a bottom of the steam drum 24 and be directed back to the first syngas cooler section 20.

A saturated steam 28, relatively free of water, may accumulate near a top of the steam drum 24. If the saturated steam 28 is above approximately 3.1 MPa, a decrease in a pressure and/or a temperature of the saturated steam 28 that causes the enthalpy of the saturated steam 28 to fall below approximately 2811 kJ/kg will result in the formation of liquid water.

In certain embodiments, the saturated steam 28 may be used as a coolant in the quench section of the quench system 50. The cooled syngas 16 from the first syngas cooler section 20 may not be completely cooled. Thus, the syngas 16 passing through the quench section may result in an increase in a temperature of the saturated steam 28 passing through the quench system 50, creating a superheated steam 32. In certain embodiments, the quench system 50 may be configured to superheat coolants other than saturated steam 28. As with the first syngas cooler section 20, the syngas 16 may pass through a shell of one or more tubes of the quench system 50, and more particularly the tubes of the quench system 50 may form the dip tube of the quench system 50, as will be further described below. The temperature of the superheated steam 32 produced from the quench system 50 may be higher than that used by downstream processes. Several factors may influence the temperature of the superheated steam 32 including, but not limited to, a composition, flow rate, and/or temperature of the syngas 16, heat transfer characteristics of the quench system 50, and so forth. In addition, the temperature of the superheated steam 32 may exceed design temperatures of certain components of the quench system 50. Thus, an attemperator system 34 may be used to reduce the temperature of the superheated steam 32. The attemperator system 34 is supplied water 36. The attemperator system 34 reduces the temperature of the superheated steam 32 by bringing the superheated steam 32 into direct contact with injected water 38. The superheated steam 32 is cooled through the evaporation of the injected water 38. In other embodiments, other systems may be used to cool the superheated steam 32. For example, a desuperheater may be used in place of the attemperator system 34. In further embodiments, the attemperator system 34 may be omitted. Thus, the attemperator system 34 and the water 36 are shown dashed in FIG. 2. In some embodiments, the quench system 50 may include one or more independent outputs configured to output a plurality of superheated steam flows for use in external applications. For example, the superheated steam 32 may be a first independent output. A portion of the superheated steam 32 directed back to the quench section for further superheating may result in a second independent output of superheated steam 32.

In addition, the enthalpy of the superheated steam 32 may be limited by the configuration of the quench system 50. For example, factors such as, but not limited to, the heat transfer area, tube arrangement, tube number, tube diameters, tube wall thicknesses, baffle arrangement, baffle number, baffle spacing, flow rates, temperatures, pressures, and so forth, may be used to configure the dip tube of the quench system 50. Specifically, in certain embodiments, the enthalpy of the superheated steam 32 may be less than approximately 3800 kJ/kg. Such superheated steam 32 may be sent directly to steam turbines. In other embodiments, the enthalpy of the superheated steam 32 may be less than approximately 3140 kJ/kg, which may be less than a minimum enthalpy threshold for supply to steam turbines. In other words, steam turbines may be supplied superheated steam with enthalpies greater than approximately 3140 kJ/kg to operate properly. Thus, in such embodiments, the quench system 50 is not configured to output the superheated steam 32 to a steam turbine. In other words, the superheated steam 32 of such embodiments may be used for heat transfer generally, but not for power generation. In other embodiments, the enthalpy of the superheated steam 32 may be between approximately 2811 kJ/kg and 3024 kJ/kg. Again, such an enthalpy range is less than the minimum enthalpy threshold for steam turbines. In addition, steam with an enthalpy greater than approximately 2811 kJ/kg can only exist as superheated steam. In other words, depressurization of superheated steam 32 with an enthalpy greater than approximately 2811 kJ/kg will not result in condensation of water. Thus, the superheated steam 32 can be transported through piping, throttled, and so forth without causing water formation, which can cause damage to steam-handling equipment. Thus, the superheated steam 32 provides control of a pressure of the steam drum 24 while simultaneously providing integration with the downstream processes, without the need for downstream treatment. A capacity of the quench system 50 is defined as the enthalpy required, as may be shown on a Mollier diagram, so that any pressure reduction or entropy increase maintains only the vapor phase for the steam produced. In practice, it may be desirable for the pressure-reduced steam to be saturated, that is, on the saturation line of the Mollier diagram.

Before being used in the downstream processes of the gasification system 10, the superheated steam 32 generated from cooling the syngas 16 may pass through a pressure control system 42, which controls the pressure of the steam drum 24 and/or depressurizes the superheated steam 32. For example, the pressure control system 42 may include, but is not limited to, a steam letdown valve, a control valve, a restriction orifice, or any other suitable pressure reduction device. A single pressure control system 42 may be used to control the pressure of the steam drum 24 and/or depressurize the superheated steam 32 that is output to an input of one or more downstream processes of the gasification system 10 as shown in FIGS. 1 and 2. For example, the superheated steam 32 may be between approximately 3,100 kPa to 19,300 kPa, 9,650 kPa to 16,500 kPa, or 12,400 kPa to 14,500 kPa, and between approximately 235 degrees Celsius to 704 degrees Celsius, 310 degrees Celsius to 350 degrees Celsius, or 330 degrees Celsius to 340 degrees Celsius, respectively. The specific conditions of the superheated steam 32 may depend on a variety of factors including, but not limited to, a composition, flow rate, temperature, and/or pressure of the syngas 16, a flow rate, temperature, and/or pressure of the saturated steam 28, operating conditions of the attemperator system 34, configuration of the quench system 50, and so forth. Thus, the conditions of the superheated steam 32 may vary in different embodiments. Moreover, the conditions of the superheated steam 32 may change during operation of the gasifier 14 in response to process changes in the gasifier 14 or elsewhere in the gasification system 10.

In certain embodiments, a valve in the stream to the HRSG system 48 controls the pressure of the steam drum 24 and a valve in the superheated steam 44 controls the downstream pressure of the superheated steam 44. The pressure of the stream to the HRSG system 48 downstream of the control valve is controlled by the power cycle. Specifically, the pressure controlled superheated steam 44 may be between approximately 2.1 MPa to 13.8 MPa, 3.4 MPa to 12.4 MPa, or 4.1 MPa to 10.3 MPa. The degree of superheat (difference between superheated temperature and saturated temperature) of the superheated steam 44 could be between approximately 3 degrees Celsius to 360 degrees Celsius, 3 degrees Celsius to 200 degrees Celsius, or 3 degrees Celsius to 28 degrees Celsius. The degree of superheat of the superheated steam 44 may be moderated as desired by the downstream process, using, for example, an attemperator. Thus, in certain embodiments, the percent pressure reduction from upstream to downstream of the pressure control system 42 may be between approximately 5 percent to 90 percent, 10 percent to 75 percent, or 25 percent to 50 percent. The specific conditions of the pressure controlled superheated steam 44 may depend on the conditions of the incoming superheated steam 32 and/or the operating conditions of the pressure control system 42. Thus, the conditions of the superheated steam 44 may vary during operation of the pressure control system 42. Moreover, the pressure control system 42 may be configured to produce multiple, different pressures and/or temperatures of superheated steam 44 for different applications. In other embodiments, one or more pressure control systems 42 may be used for each of the downstream processes of the gasification system 10. Examples of downstream processes of the gasification system 10 include, but are not limited to, a gas treatment system 46, a heat recovery steam generation ("HRSG") system 48, a process heat exchanger, a reactor, an attemperator, or a combination thereof. In other words, the superheated steam 44 may be output to any component of a power generation system. For example, the superheated steam 44 may be output to the HRSG system 48 to be further superheated and then supplied to a steam turbine. In other embodiments, the superheated steam 44 may be output directly to the steam turbine. In further embodiments, the pressure control system 42 may be omitted. Thus, the pressure control system 42 is shown dashed in FIG. 1. In other words, the superheated steam 32 may be used directly in the HRSG system 48, the gas treatment system 46, or other downstream processes, without pressure control and with little to no pressure drop. In other embodiments, the pressure control system 42 may be used for some but not all downstream processes. For example, the pressure control system 42 may be used for the gas treatment system 46, but the superheated steam 32 may be used directly in the HRSG system 48, without pressure control.

The quench system 50, in addition to being a superheating section, is an after cooler section, and may be configured to remove particulates from the syngas 16 and provide further cooling of the syngas 16, as described in more detail below. In the illustrated embodiment, the first syngas cooler section 20 is located adjacent to the quench system 50, however a second syngas cooler section 30, as further shown and described with respect to FIG. 10, may be positioned between the first syngas cooler section 20 and the quench system 50. The second syngas cooler section 30 may be provided for additional heating of the saturated steam 28 from the first syngas cooler section 20. Alternatively, the second syngas cooler section 30 may be fluidically connected to the output of the quench system 50 to complete the superheating of the saturated steam 28 received by the quench system 50. The superheated steam output, such as from the quench system 50, may direct cooled syngas 54 to the gas treatment system 46, and receive water stream 52 therefrom. Specifically, the water stream 52 may be directed from the gas treatment system 46 to the quench system 50. The syngas 54 exiting the quench system 50 may be treated in the gas treatment system 46 to produce a treated syngas 56, which may be used for power generation, chemical production, or various other applications in the system 10. Particulates in the syngas 16 may accumulate in the quench system 50 and may be removed as a slag 58. In addition, a portion of the water 60 in the quench system 50 may be directed to a water treatment unit 62 for further processing before being reused in the quench system 50, or elsewhere in the gasification system 10.

Figure 3:
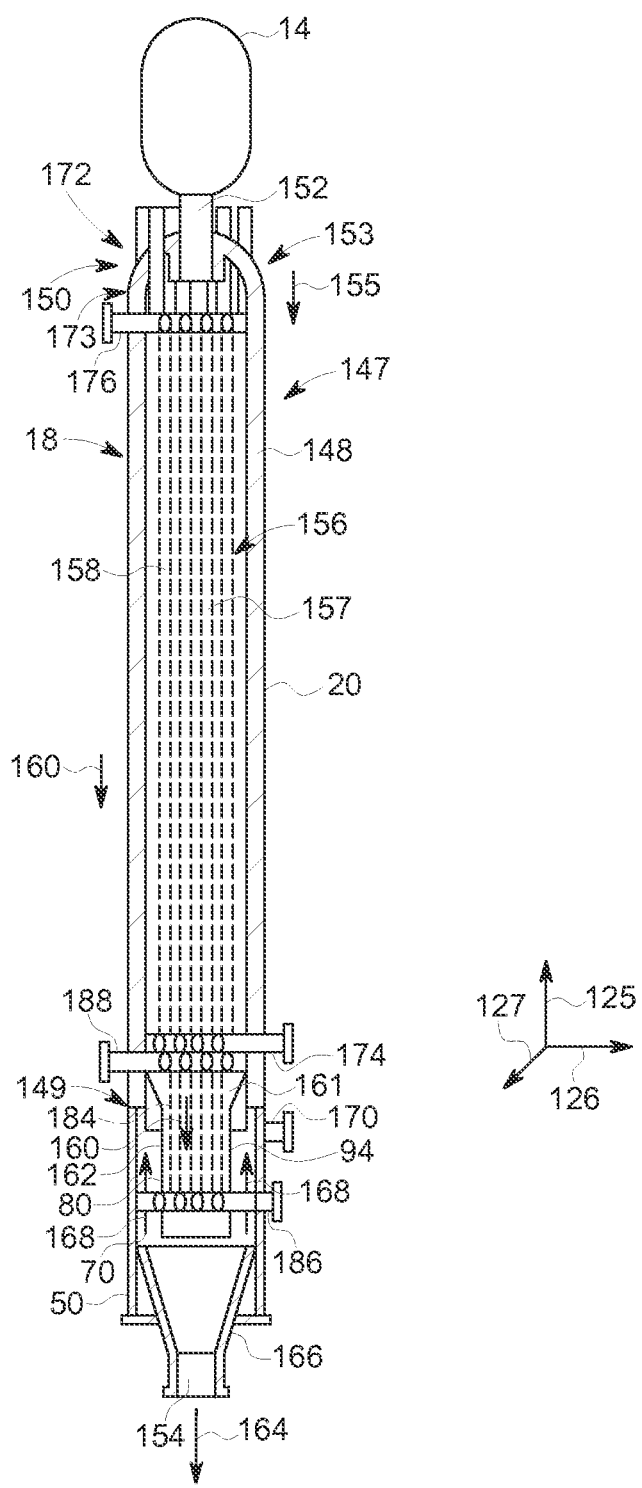
FIG. 3 is a cross-sectional view of an embodiment of a syngas cooler.

FIG. 3 is a cross-sectional side view of an embodiment of the gas cooler 18, such as syngas cooler 18, for use with the gasification system 10. The syngas cooler 18 may have an axial, or longitudinal, axis 125, a radial axis 126, and a circumferential axis 127. The syngas cooler 18 may include a housing 148, such as a vessel, which may be made of a suitable material, such as, but not limited to, low alloy steels, chrome molybdenum alloy steels, and so forth. The housing 148 functions as a housing or outer casing for the syngas cooler 18, enclosing both an upper region 147 of the syngas cooler 18 as well as a lower region 149 of the syngas cooler 18. The housing 148 may be elongated along the axial axis 125. The upper region 147 of the syngas cooler 18 may include a dome-shaped portion 150 that includes an inlet 152 extending into a throat 153. The lower region 149 includes an outlet 154 of the quench system 50. A gas path 157 is provided in an interior region 156 of the housing 148, and is defined by the space between the inlet 152 and the outlet 154. The throat 153, which is adjacent the inlet 152, expands in a downstream direction 155 from the inlet 152 toward the outlet 154.

The interior region 156 houses the first syngas cooler section 20 and at least a portion of the quench system 50. The first syngas cooler section 20 includes tubing 158, and the superheating section of the quench system 50 includes tubing 184. The tubing 158, 184 may extend in the axial direction 125, the radial direction 126, and/or the circumferential direction 127. In certain embodiments, the tubing 158 and 184 may include internal or external fins, coatings, grooves, or other features to increase a surface area of the tubing 158, 184. Liquid, such as water 22, may flow through the tubing 158 of the first syngas cooler section 20. Saturated steam 28 may flow through the tubing 184 of the quench system 50. Thus, the tubing 158 and 184 may act as heat exchangers within the syngas cooler 18, and may circulate the coolant to an external heat exchanger for removal of heat. Accordingly, the tubing 158 and 184 may be made of a thermally conductive material suitable for use with hot syngas, such as, but not limited to, nickel iron chromium alloy steels and so forth. Other examples of materials that may be used for the tubing 158 and 184 include, but are not limited to, refractory materials, refractory metals, non-metallic materials, coatings, clays, ceramics, cermets, MCrAlY (chromium aluminum yttrium) coatings (where M=cobalt, nickel, or cobalt/nickel) and oxides of aluminum, silicon, magnesium, and calcium.

During operation, the syngas 16 generated in the gasifier 14 may generally flow in a downward manner parallel to the tubing 158 and 184 as indicated by arrows 160, which may constitute a longitudinal flow path for the gas path 157 through the syngas cooler 18. That is, the syngas 16 flows through a gas passage of the syngas cooler 18 that extends in the flow direction 160 lengthwise in the interior region 156 of the housing 148. Accordingly, the syngas 16 enters the first syngas cooler section 20 through the inlet 152, flows lengthwise through the interior region 156 of the first syngas cooler section 20, flows lengthwise through the interior region 156 of the quench system 50, and then exits the syngas cooler 18 through a syngas outlet 170. In other words, the first syngas cooler section 20 and the quench system 50 may be disposed in series one after another along the axial axis 125. In addition, a second syngas cooler section 30 (FIG. 10), or a plurality of additional syngas cooler sections (30, 190, 224, see FIG. 10), may be disposed axially between the first syngas cooler section 20 and the quench system 50. In this manner, the syngas 16 may sequentially contact outer surfaces of the tubing 158 and 184 of the syngas cooler 18 and the fluid flowing through the tubing 158 and 184, and any other tubing from syngas cooler sections therebetween, may act to cool the syngas 16 as the syngas 16 travels through the syngas cooler 18. Because of this cooling process, saturated steam 26 may be generated in the tubing 158 of the first syngas cooler section 20, and superheated steam 32 may be generated in the tubing 184 of the quench system 50.

The quench system 50 includes a dip tube 80 formed by the tubing 184. The tubing 184 may be tightly arranged to form the dip tube 80, such that no leakage can occur through the dip tube 80. The tubing 184 of the dip tube 80 may be arranged to form a conduit 162 having an exit cone 161 in the lower region 149 of the syngas cooler 18 that aids in directing the cooled syngas 16 and slag 58 out of the syngas cooler 18. For example, as the slag 58 exits the conduit 162, the slag 58 may flow in a generally downward direction 164 to exit the syngas cooler 18 via a quench cone 166 of the quench system 50. In contrast, the cooled syngas 16 may flow in a general upward direction 168 toward the syngas outlet 170 as the cooled syngas 16 exits the conduit 162. A transfer line may connect to the syngas outlet 170 to transmit the syngas 16 to the gas treatment system 46. The untreated syngas 16 may corrode elements of the syngas cooler 18, such as the tubing 158 and 184 and/or the inner wall of the vessel 148, if these elements were to be exposed to the untreated syngas 16. Accordingly, a gas inlet 172 may transmit a non-corrosive fluid, such as a shielding gas 173 (e.g., nitrogen), to the syngas cooler 18. This non-corrosive fluid may flow generally downward between the vessel 148 and the tubing 158 and 184 of syngas cooler 18 to form a protective barrier, for example, against syngas migration into the annular space between the tubes 158 and 184 and the vessel 148.

In the embodiment illustrated in FIG. 3, the tubing 158 and 184 is oriented substantially parallel to the longitudinal axis 125. In addition, the first syngas cooler section 20 includes a first syngas cooler section inlet header 174, or first input, that may be located near a bottom of the first syngas cooler section 20. A first syngas cooler section outlet header 176, or first output, may be located near a top of the first syngas cooler section 20. If the first output outputs saturated steam, then it may be referred to as a saturated steam output 176. Thus, the water 22 may enter the inlet header 174 and move in an upward manner through the tubing 158 opposite to the direction indicated by arrows 160. The mixture 26 of saturated steam and water exits the outlet header 176. In other embodiments, the first syngas cooler section 20 may be configured with the water 22 entering near the top of the first syngas cooler section 20 (e.g., header 176) and the mixture 26 of saturated steam and water exiting near the bottom of the first syngas cooler section 20 (e.g., header 174).

Similarly, the quench system 50 may include quench section inlet header 186, or second input, and quench section outlet header 188, or second output. Thus, the saturated steam 28 may enter the inlet header 186, flow in a direction opposite to that of arrows 160, and superheated steam 32 may exit the outlet header 188. Since the second input receives saturated steam, it may also be referred to as a saturated steam input 186, and since the second output 188 outputs superheated steam it may also be referred to as a superheated steam output 188. In other words, the first output 176 of the first syngas cooler section 20 may be coupled to the second input or saturated steam input 186 of the quench system 50. In other embodiments, the direction of the saturated steam 28 through the quench system 50 may be reversed. In other words, the saturated steam 28 may flow in the direction of arrows 160. As with the tubing 158 of the first syngas cooler section 20, the tubing 184 of the quench system 50 may be oriented substantially parallel to the longitudinal axis 125, however alternate embodiments will be further described below.

Figure 4:
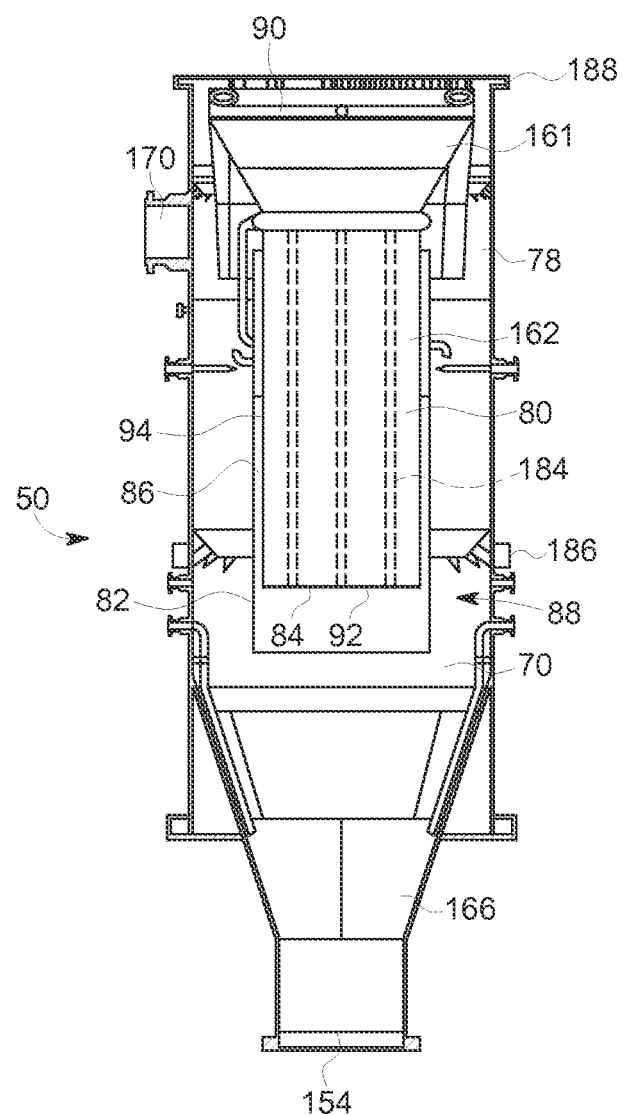
FIG. 4 is a cross-sectional view of an embodiment of a quench system.

FIG. 4 shows the quench system 50 including a superheating section 78 having the dip tube 80, the quench pool 70, and the quench cone 166. Relative to the gas path 157, the dip tube 80 includes an upstream portion 90 and a downstream portion 92. Because a wall 94 of the dip tube 80 of the superheating section 78 includes the tubing 184 in a thickness of the wall 94 for superheating the saturated steam 28 from the first syngas cooler section 20, the dip tube 80 of the quench system 50 directly incorporates a heat exchanger for cooling the syngas 16 passing therethrough. Thus, the quench system 50 need not require a quench ring, which in conventional quench systems is an annular shaped ring arranged to deliver water along a conventional dip tube as a coolant. However, in alternate embodiments, the quench system 50 may include a quench ring such as for keeping any slag 58 from sticking to the sides of the dip tube 80. The quench system 50 further includes a draft tube 82, concentrically surrounding the conduit 162 of the dip tube 80, and configured to guide syngas 16 exiting a dip tube exit 84 to the syngas outlet 170 via an annular space 86 between the dip tube 80 and the draft tube 82. The dip tube 80 is thus disposed to guide the syngas 16 towards the cooling fluid (e.g., water) in the quench pool 70. The syngas 16 may contact the cooling fluid causing some of the cooling fluid to evaporate, thereby cooling the syngas 16. From the dip tube 80, the syngas 16 may flow up through the annular space 86 to the gas outlet 170. The quench system 50 further includes the quench section inlet and outlet headers 186, 188 (saturated steam input 186 and superheated steam output 188), and a quench water inlet 88 to the quench pool 70, as well as the outlet 154 at the quench cone 166.

Figure 5:
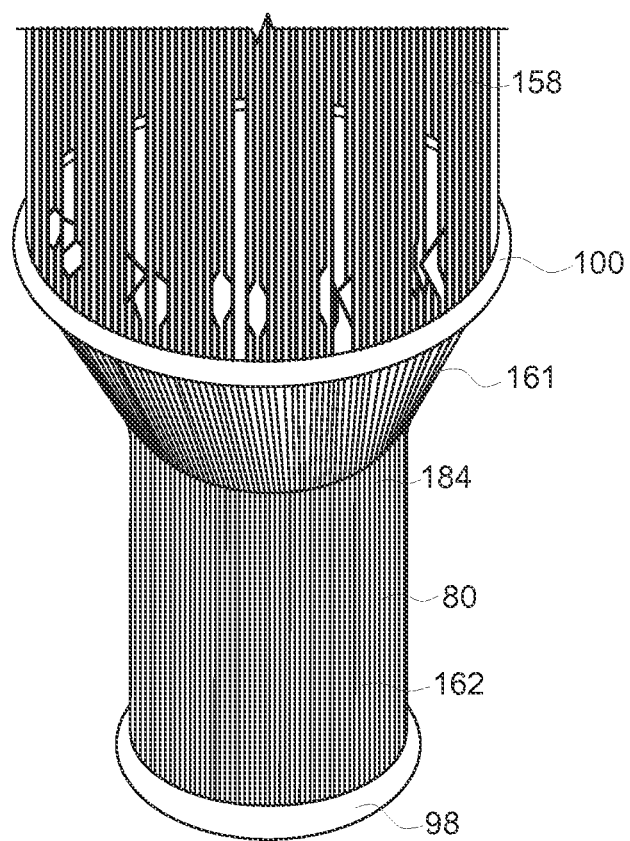
FIG. 5 is a perspective view of an embodiment of a dip tube for the quench system of FIG. 4.
Figure 6:
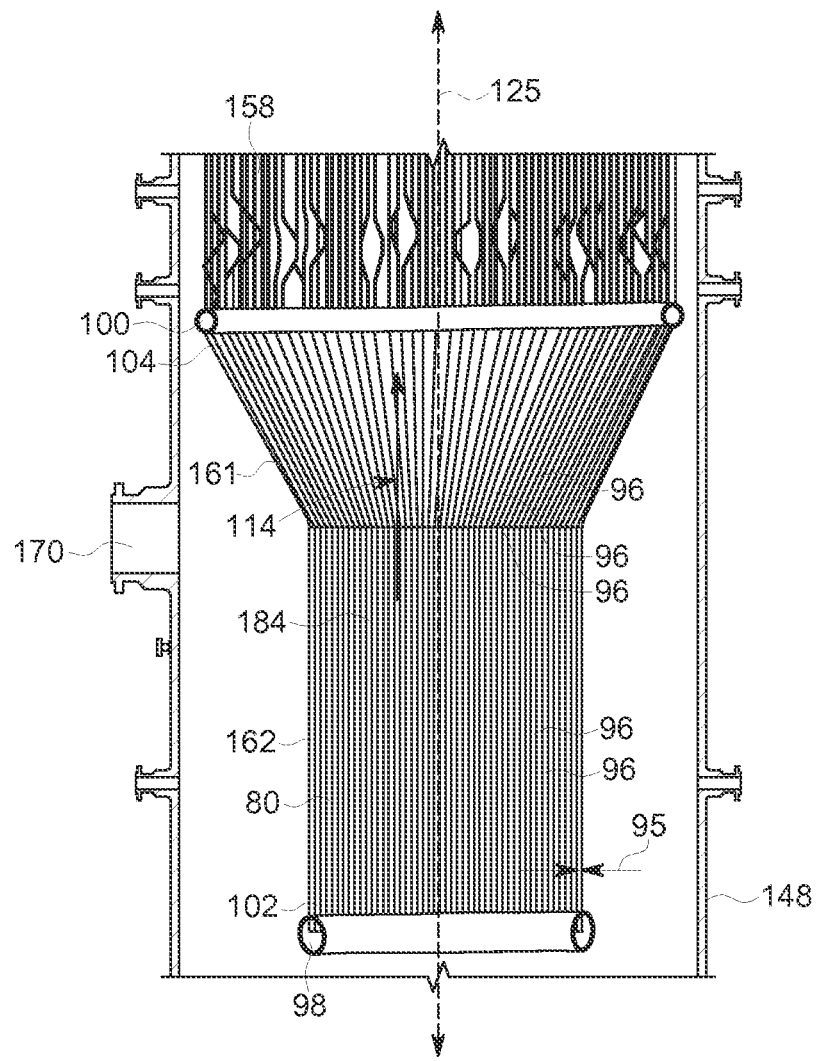
FIG. 6 is a cross-sectional view of the dip tube of FIG. 5.

FIGS. 5 and 6 depict one embodiment of the dip tube 80 for use in the superheating section 78 of the quench system 50 of the syngas cooler 18. The dip tube 80 includes the tubing 184 having a plurality of pipes 96 arranged in substantially longitudinally extending direction within the conduit portion 162. In the illustrated embodiment, the dip tube 80 further includes the exit cone 161, and therefore the pipes 96 of the tubing 184 may fan out radially outwardly at an intersection of the conduit portion 162 and the exit cone 161. In order to provide the dip tube 80 with a radially imperforate wall (such that syngas 16 cannot radially escape through the wall 94 of the dip tube 80 while traveling along the gas path 157 through the dip tube 80), the portions of the pipes 96 in the exit cone 161 may have increasingly larger diameters as compared to the portions of the pipes 96 in the conduit 162. Alternatively, solid wall sections may be interposed between the exit portions of the pipes 96 in the exit cone 161, or the pipes 96 may branch off into additional pipes 96 as needed. The wall 94 of the dip tube 80 thus may include a frustoconical shape at the upstream portion 90 and a cylindrical shape at the downstream portion 92. In general, a wall thickness 95 of the wall 94, measured from an inner periphery of the dip tube 80 to an outer periphery of the dip tube 80, is defined by an outer diameter of the pipes 96, where an inner diameter of the pipes 96 provides a steam path 114. The dip tube 80 includes an inlet manifold 98 fluidically connected to the quench section inlet header 186, and an outlet manifold 100 fluidically connected to the quench section outlet header 188. Thus, saturated steam 28 directed to the inlet manifold 98 from the saturated steam input and inlet header 186 will disperse the saturated steam 28 into the tubing 184, which is fluidically connected at an upstream end 102 of the tubing 184 to the inlet manifold 98 and at a downstream end 104 of the tubing 184 to the outlet manifold 100. The saturated steam 28 will travel along a steam path 114 through the tubing 184 and exit as superheated steam 32 to the outlet manifold 100. The superheated steam 32 will then exit through the superheated steam output and outlet header 188. In the illustrated embodiment, the upstream end 102 of the tubing 184 corresponds to a downstream portion 92 of the dip tube 80, and a downstream end 104 of the tubing 184 corresponds to an upstream portion 90 of the dip tube 80. Thus, the saturated steam 28 to be superheated flows in a substantially opposite direction in which the syngas 16 flows.

While the tubing 184 in FIGS. 5 and 6 is illustrated with each individual pipe 96 in the tubing 184 extending substantially directly from the inlet manifold 98 to the outlet manifold 100, the pipes 96 may alternatively include one or more turns prior to connecting with the outlet manifold 100 to increase the distance in which the saturated steam 28 to be superheated must travel, and therefore the amount of time the saturated steam 28 spends traveling through the pipes 96. For example, a pipe 96 may extend from the inlet manifold 98 towards the outlet manifold 100 (but not output to the outlet manifold 100), then return towards the inlet manifold 98, and then extend back towards the outlet manifold 100 in a serpentine arrangement and then fluidically connect with the outlet manifold 100. Alternatively, the pipe may extend in more turns prior to connecting with the outlet manifold 100.

Figure 7:
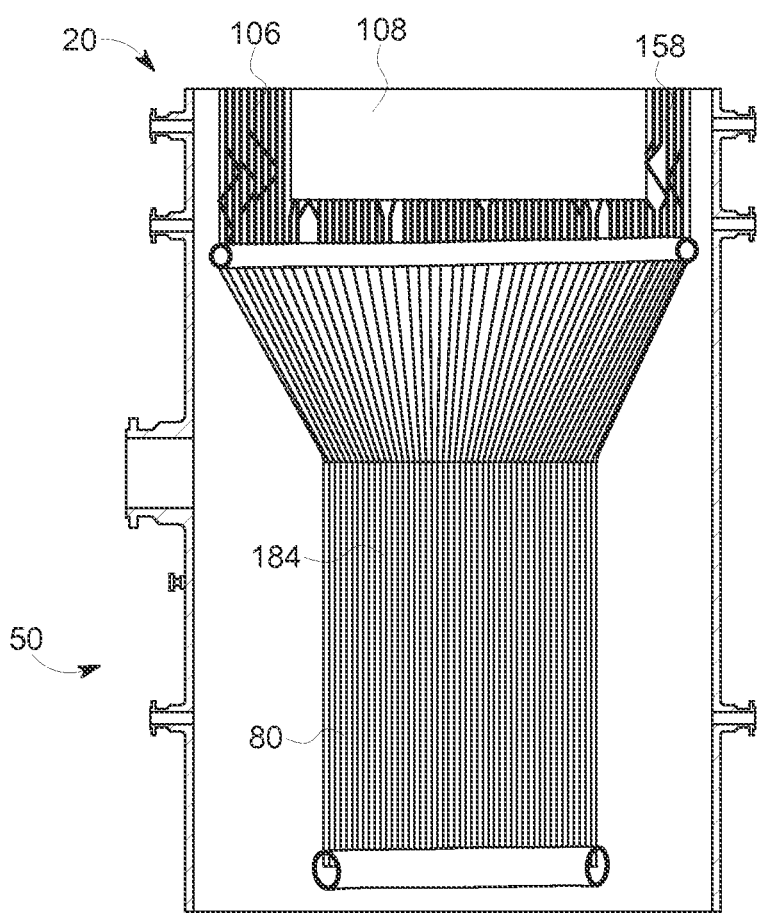
FIG. 7 is a cross-sectional view of the dip tube of FIG. 5 with an embodiment of a platen.

FIG. 7 illustrates the dip tube 80 of the quench system 50 as well as a portion of a tube cage 106, which may include the tubing 158 of the first syngas cooler section 20. In this embodiment, one or more platens 108 are further provided in the first syngas cooler section 20. Additional saturated steam 28 may be generated by contact of the syngas 16 with arrays of tubes within the platen 108. The heat from the syngas 16 is transferred to the water in the tubes of the platen 108 to create the saturated steam 28. The saturated steam 28 from the platen 108 may be directed to steam drum 24 or directly to tubing 184 of dip tube 80 or of another superheating section. While the dip tube 80 of FIGS. 5 and 6 is illustrated, other embodiments of the dip tube 80 having alternate arrangements of the tubing 184 therein may alternatively be incorporated. Alternatively the tube cage 106 may be fluidically connected to the outlet manifold 100 to receive the superheated steam therefrom for further superheating within tubing of the tube cage 106. In such an embodiment, the tube cage 106 is separate from the tubing 158 used for saturated steam generation. This arrangement may be applicable in circumstances where the length of tubing 184 in the dip tube 80 is insufficient for superheating the saturated steam 28, and the tube cage 106 represents a portion of a superheating section extension. Also in such an arrangement, the platen 108 may include or be fluidically connected to the tubing 158 for saturated steam generation.

Figure 8:
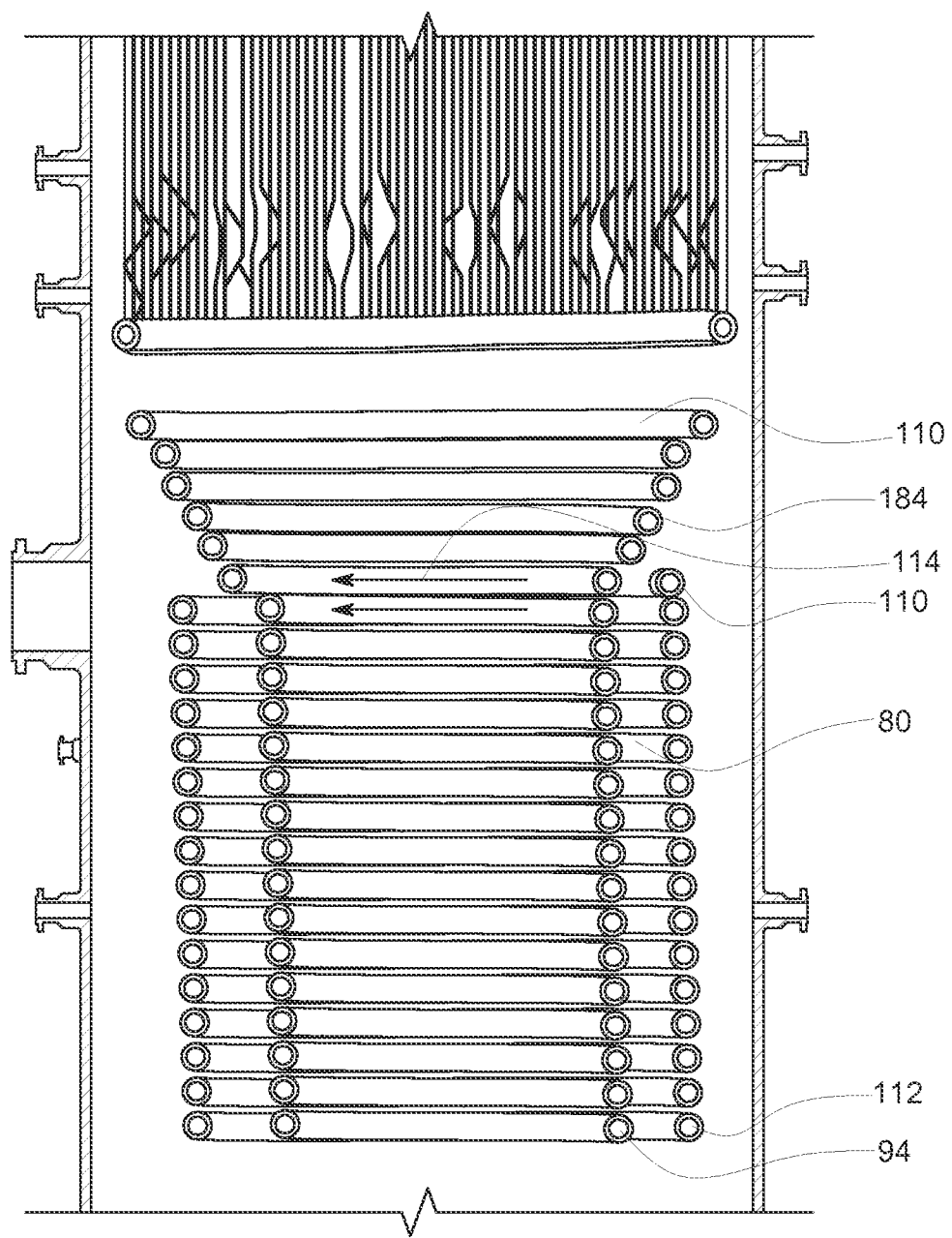
FIG. 8 is a cross-sectional view of a portion of an alternate embodiment of a dip tube for the quench system of FIG. 4
Figure 9:
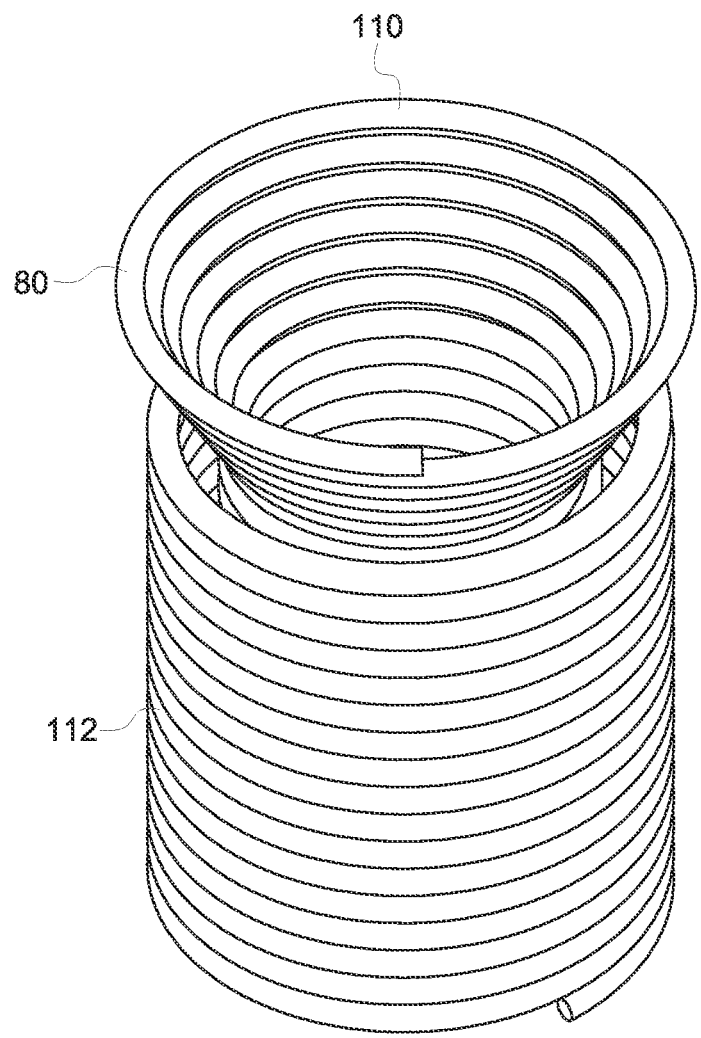
FIG. 9 is a perspective view of the dip tube of FIG. 8.

FIGS. 8 and 9 illustrate another embodiment of a dip tube 80 incorporating tubing 184. In this embodiment, the tubing 184 includes one or more pipes 110 helically arranged to form the wall 94 of the dip tube 80 such that a saturated steam 28 entering the tubing 184 at the upstream end 102 will travel a greater distance along steam path 114, and thus spend a longer period of time, within the tubing 184 prior to exiting the outlet header 188 as compared to the pipes 96 in the tubing 184 that extend substantially directly from an inlet header 186 to an outlet header 188 (using shorter steam path 114). The dip tube 80 may include a combination helically wound conduit and exit cone portion, and may further include a concentrically surrounded outer tubing portion 112 that may serve as the draft tube 82 or that may merely encase the dip tube 80. The outer tubing portion 112 may also include helically wound pipe or pipes 110 as shown, or may alternatively include the longitudinally extended pipes 96 as previously illustrated.

While various arrangements of the tubing 184 may be provided which may also help facilitate superheating the saturated steam 28, different arrangements of the tubing 184 and the shapes of the pipes 96, 110 within the tubing 184 may provide other advantages such as provide certain heat transfer and/or mechanical advantages in certain applications. The configuration of the tubing 184 may be selected depending on the specifications of a particular application.

While one or more syngas cooler sections 30, 190, 224 may be interposed between the first syngas cooler section 20 and the quench system 50, the syngas cooler 18 having the first syngas cooler section 20 and quench system 50 is capable of superheating saturated steam 28 from the first syngas cooler section 20 without providing any additional length to the overall syngas cooler 18. That is, by incorporating the superheating section 78 into the quench system 50, the syngas cooler 18 can provide a superheating section 78 in a more compact cooler 18.

Figure 10:
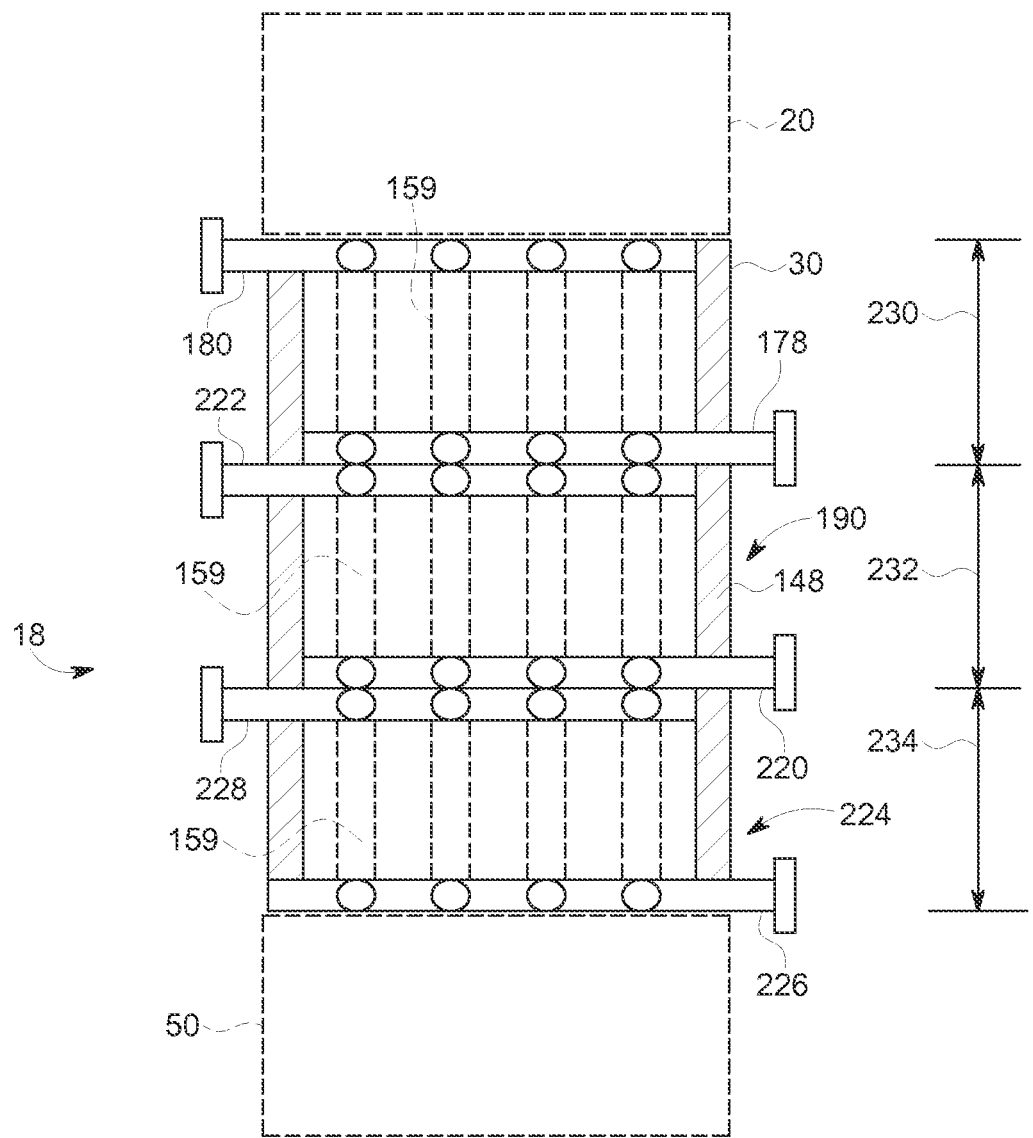
FIG. 10 is a cross-sectional side view of a portion of an embodiment of a syngas cooler.

FIG. 10 is a cross-sectional side view of an optional portion of an embodiment of the syngas cooler 18. In the illustrated embodiment, a second syngas cooler section 30, which includes an inlet header 178 and an outlet header 180, is located above a third syngas cooler section 190, which includes an inlet header 220 and an outlet header 222. Similarly, a fourth syngas cooler section 224 is located below the third syngas cooler section 190. The fourth syngas cooler section 224 includes an inlet header 226 and an outlet header 228. While three additional cooler sections 30, 190, 224 are illustrated, it should be understood that any number of additional cooler sections (including no additional cooler sections) could be employed between the first syngas cooler section 20 and the quench system 50. In the illustrated embodiment, the tube lengths 230, 232, and 234 of each of the syngas cooler sections 30, 190, and 224, respectively, are approximately the same such that the heat transfer areas of each of the syngas cooler sections 30, 190, and 224 may also be approximately the same and manufacturing of the syngas cooler sections 30, 190, and 224 may be simplified, however the syngas cooler sections 30, 190, 224 can have different lengths as needed to accommodate different needs for heat transfer areas. Further, the configuration of the tubing 159 in any of the syngas cooler sections may include longitudinally extending tubing 159 (similar to longitudinally extending tubing in the conduit portion of the dip tube), coiled tubing, tubing arranged in a U-tube bundle, or in a winding up and down serpentine manner. In addition, the tubing 159 in the syngas cooler sections may have different diameters, tube wall thicknesses, lengths, sizes, patterns, orientations, materials of construction, and so forth. When different lengths of the tubing 159 are employed for different additional syngas cooler sections, the heat transfer areas will also be different, such that if saturated steam 28 at the same pressure and temperature is directed to differing syngas cooler sections, the superheated steam generated by one syngas cooler section may be at a higher temperature and/or pressure than the superheated steam generated by another syngas cooler section. Such a configuration of the syngas cooler 18 may be used when superheated steam 32 at different conditions is used in the gasification system 10. For example, the superheated steam 32 from one syngas cooler section may be used in a process of the gasification system 10 that uses higher temperature superheated steam 32 than a process using the superheated steam 32 from another syngas cooler section.

A design of a superheater section 78 is provided within a radiant syngas cooler 18 and quench system 50, such that the height of the cooler 18 does not need to further increase. Instead, the quench dip tube 80 is used as a superheater section 78 along with the radiant syngas cooler tube cage 106 or a small portion of a superheater placed below the platen 108, where the one or more platens 108 may be used for saturated steam generation. The dip tube 80 is made of superheating tubing 184, including one or more pipes 96, 110. Saturated steam 28 will enter quench superheating section 78 and flow counter-current from quench system 50 to tube cage 106 or into the superheater section below the platens 108. This way, higher level of superheated steam 32 can be achieved without increasing the height of the gas cooler 18. There may further be an insulation provided along the superheating section 78 in the dip tube 80 to reduce the heat loss to quenched syngas 16.

Thus, superheated steam 32 from the gasification system 10 is provided as a product. No separate superheater is required. There will be improved heat transfer efficiency with better utilization of surface area and length by using surface area of the dip tube 80. Additional advantages include reduced to no height addition for superheating, elimination of quench ring, and simple water injection to quench pool 70 for maintaining liquid level.

Like or similar designations in the drawings and description have been used to refer to like or similar parts of the disclosure. As used herein, the terms "first," "second," and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment Thus, it is intended that the present disclosure covers such modifications and variations as come within the scope of the appended claims and their equivalents.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A quench system comprising:
    a housing having a longitudinal axis;
    a gas path for a gas within the housing;
    a steam input;
    a steam output; and,
    a dip tube within the housing, the dip tube including tubing arranged to form a wall, a steam path disposed within the tubing in a thickness of the wall, the steam path separate from the gas path, the dip tube configured to allow passage of the gas along the gas path, the steam input fluidically connected to the steam output by the tubing;
    wherein the quench system is configured to cool the gas along the gas path and heat steam along the steam path within the tubing of the dip tube.

2. The quench system of claim 1, further comprising a quench pool configured to contain a pool of cooling fluid for the gas at an exit of the dip tube.

3. The quench system of claim 1, further comprising a draft tube and a gas outlet, the dip tube encircled by the draft tube, a space between the draft tube and the dip tube configured to fluidically connect the gas outlet with an exit of the dip tube.

4. The quench system of claim 1, wherein the dip tube further includes a an inlet manifold fluidically connected to the steam input, and an outlet manifold fluidically connected to the steam output, wherein the tubing fluidically connects the inlet manifold to the outlet manifold.

5. The quench system of claim 1, wherein the tubing includes a plurality of pipes within the thickness of the wall.

6. The quench system of claim 1, wherein the tubing is at least partially helically arranged with respect to the longitudinal axis of the housing.

7. The quench system of claim 1, wherein the tubing is arranged to form a cone and a conduit of the dip tube.

8. A system comprising:
    a gas cooler including:
        a housing having a longitudinal axis;
        a gas path within the housing;
        a quench system including a quench pool, a saturated steam input arranged to receive a saturated steam, and a dip tube having an upstream portion and a downstream portion, the dip tube including tubing arranged to form a wall of the dip tube, a steam path disposed within the tubing in a thickness of the wall, the wall configured to pass a gas from the upstream portion to the downstream portion of the dip tube along the gas path; and,
        a superheated steam output;
    wherein the tubing fluidically connects the saturated steam input to the superheated steam output, and the gas passing along the gas path heats the saturated steam in the tubing.

9. The system of claim 8, wherein the gas cooler further includes a gas cooler section disposed upstream of the quench system, the gas cooler section configured to cool the gas along the gas path and generate the saturated steam.

10. The system of claim 8, wherein the gas cooler further includes a platen configured to at least partially absorb heat from the gas in the gas path and generate the saturated steam.

11. The system of claim 8, wherein the superheated steam output is disposed upstream of the saturated steam input with respect to the gas path.

12. The system of claim 8, further comprising a draft tube and a gas outlet, the dip tube encircled by the draft tube, a space between the draft tube and the dip tube configured to fluidically connect the gas outlet with an exit at the downstream portion of the dip tube.

13. The system of claim 8, wherein the dip tube further comprises an input manifold and an output manifold, the input manifold fluidically connected to the saturated steam input, and the output manifold fluidically connected to the superheated steam output, wherein the tubing includes a plurality of pipes that extend from the input manifold to the output manifold, the input manifold fluidically connected to the output manifold by the tubing.

14. The system of claim 13, wherein the plurality of pipes extend substantially longitudinally with respect to the longitudinal axis of the housing.

15. The system of claim 8, wherein the tubing extends substantially helically with respect to the longitudinal axis of the housing.

16. The system of claim 8, further comprising a quench water input to the quench system, and a gasifier upstream of the quench system, the gasifier configured to generate the gas, wherein the gas is syngas, and the quench system further outputs the syngas and slag.

17. The system of claim 8, further comprising a tube cage upstream of the quench system with respect to the gas path, the tube cage configured to additionally superheat the saturated steam.

18. The system of claim 8, wherein the wall of the dip tube includes an inner periphery and an outer periphery, the wall thickness defined between the inner and outer periphery and by an outer diameter of the tubing.

19. The system of claim 18, wherein the gas moving through the dip tube is prevented from radially escaping from the inner periphery to the outer periphery of the dip tube by the wall.

20. A method of superheating steam in a syngas cooler, the method comprising:
    directing saturated steam to a dip tube of a quench system of the syngas cooler, the dip tube having a wall formed of superheating tubing within a thickness of the wall;
    passing a syngas along a gas path from an upstream portion to a downstream portion of the dip tube, the syngas exiting the dip tube into a quench pool; and,
    superheating the saturated steam through the superheating tubing of the dip tube from the downstream portion to the upstream portion of the dip tube using heat from the syngas.

* * * * *